United States Patent [19]

Huffman

[11] 4,020,053

[45] Apr. 26, 1977

[54] PHENYLAZO-(N-ALKYLANILINO)-M-TOLUENE SULFONIC ACID OR SULFONAMIDE ACID DYES FOR POLYAMIDE FIBER MATERIALS

[75] Inventor: Allan M. Huffman, Lock Haven, Pa.

[73] Assignee: American Color & Chemical Corporation, Charlotte, N.C.

[22] Filed: Dec. 2, 1974

[21] Appl. No.: 528,692

[52] U.S. Cl. .............................. 260/205; 260/206; 260/207; 260/207.1; 260/508; 260/509; 260/556 B
[51] Int. Cl.[2] .................. C09B 29/08; D06P 1/06; D06P 1/08; D06P 3/26
[58] Field of Search ........ 260/205, 206, 207, 207.1

[56] References Cited

UNITED STATES PATENTS

| | | | |
|---|---|---|---|
| 3,483,180 | 12/1969 | Ramanathan | 260/158 |
| 3,535,306 | 10/1970 | Altermatt et al. | 260/207.1 |
| 3,579,497 | 5/1971 | Ramanathan et al. | 260/158 |
| 3,685,952 | 8/1972 | Renfrew | 260/205 X |

OTHER PUBLICATIONS

Venkataraman, "The Chemistry of Synthetic Fibers," vol. I, p. 270 (1952).
El-Sebai et al., Die Pharmazie, vol. 26, pp. 615–616 (1971).

Primary Examiner—Floyd D. Higel
Attorney, Agent, or Firm—Armstrong, Nikaido & Marmelstein

[57] ABSTRACT

A series of azo dyes for dyeing polyamide fibrous material are provided by coupling an appropriate diazotized aminobenzene into an appropriately substituted N-alkyl-N-phenylbenzylamine. The dyes are characterized by the presence of one sulfonic acid group, either as the free acid or in salt form, and by the presence of one sulfamyl group. The single sulfonic acid group and single sulfamyl group are positioned interchangeably as a substituent on either the aminobenzene base or the benzyl radical forming a portion of the N-alkyl-N-phenylbenzylamine. When dyed from an appropriate dye bath, these dyes produce dyeings on polyamide fiber material characterized by outstanding lightfastness and excellent transfer properties.

6 Claims, No Drawings

PHENYLAZO-(N-ALKYLANILINO)-M-TOLUENE SULFONIC ACID OR SULFONAMIDE ACID DYES FOR POLYAMIDE FIBER MATERIALS

BACKGROUND OF THE INVENTION

A great many azo dyestuffs have been proposed over the past century which contain sulfonic acid substituents. Such dyestuffs have traditionally found application as acid dyestuffs for woolen fabric materials. Although extensive research has been conducted in this area of dyestuff chemistry over the past century, recent demands for dyestuffs with specific properties applicable to new fabric materials has rendered most of such early dyestuffs inapplicable to modern needs. As one example of a specialized area of dyestuff application may be mentioned carpet dyeing. In the dyeing of carpets it is necessary to provide a dyestuff with excellent "transfer". The transfer properties of a dyestuff relate to their ability to produce level dyeings even in heavy carpets and with filaments of a large diameter. Nylon carpeting represents a prime example of such a material which requires dyes of excellent transfer properties. Other problems occur in the dyeing of nylon carpeting which are occasioned by variations in the carpeting itself: for example, nylon carpeting may have localized areas of differing crystallinity, due perhaps to differing stresses established in the cold drawing to which the fiber is subjected during manufacture. Such localized areas accept the acid dyes at different rates and in varying amounts, depending upon the physical characteristics of the carpet in each area. With a dyestuff of excellent transfer properties, it is possible to dye the carpeting with an evenness not possible with dyestuffs lacking such transfer properties. In addition to transfer properties, fastness to light is also an important consideration.

I have discovered a new series of acid dyes which dye polyamide fiber material, in particular carpet material, in shades ranging from bright canary yellow to rich golden yellow. The dyeings are characterized by outstanding lightfastness and transfer properties.

Acid dyes made from an N-alkyl-N-phenylbenzylamine coupler have been reported in the past, but none of these contain a sulfamyl group in addition to a sulfonic acid group. Among the known structures are C.I. 13150, which is 2,5-dichlorosulfanilic acid coupled into N-ethyl-N-phenylbenzylamine. Similar dyes listed in the Colour Index are C.I. 13145, C.I. 13155, C.I. 13160, C.I. 13165, C.I. 13170, C.I. 13175, C.I. 13180, and C.I. 13185. A series of heterocyclic dyes made by coupling a heterocyclic base into an N-alkyl-N-phenyl-benzylamine containing a sulfonic acid group are reported in published Japanese Application No. 72/05757.

Disperse dyes containing a sulfamyl group, made by coupling a diazotized aminobenzene into an α-(N-alkylanilino)-m-toluenesulfonamide, are reported in U.S. Pat. No. 3,685,952 of Edgar E. Renfrew. These dyes are water insoluble, contain no sulfonic acid groups and are suited primarily as dyes for polyester fibers rather than polyamide material.

SUMMARY OF THE INVENTION

In accordance with the invention there is provided a dye of the formula:

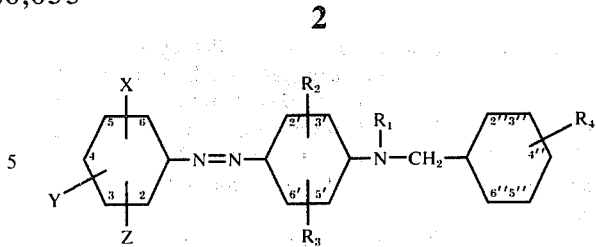

wherein:
a. X is a member selected from the group consisting of $SO_3M$ and $SO_2NR_5R_6$ in which:
   1. M is hydrogen an alkali metal cation, the ammonium ion or a hydroxyalkylammonium cation, the alkyl portion of which has from 3–12 carbon atoms; and
   2. $R_5$ and $R_6$ are independently selected from the group consisting of hydrogen, lower alkyl, cyano lower alkyl, phenyl and hydroxy lower alkyl;
b. Y and Z are members independently selected from the group consisting of hydrogen, chlorine, bromine, lower alkyl, and lower alkoxy;
c. $R_2$ and $R_3$ are members independently selected from the group consisting of hydrogen, lower alkyl, lower alkoxy, chlorine and bromine;
d. $R_1$ is a member selected from the group consisting of lower alkyl, cyano lower alkyl and N-lower alkyl carbamyl; and
e. $R_4$ is independently selected from the same group as X, except that when $R_4$ is $SO_3M$, X is $SO_2NR_5R_6$ and that when X is $SO_3M$, $R_4$ is $SO_2NR_5R_6$.

Within the above definition it is understood that $SO_3M$ represents both the free acid and the various salt forms which are suitable for use in the dyeing process such as sodium, potassium, and nitrogen containing salt forms. The term lower alkyl when used herein, either substituted or unsubstituted, refers to an alkyl group having up to 6 carbon atoms.

In accordance with another aspect of the invention, there is provided dyed polyamide fiber material and in the preferred form, dyed nylon carpet, the coloration of which is accomplished by the application of the dyestuffs of the invention to the polyamide material by conventional procedures known to the trade.

DETAILED DESCRIPTION OF THE INVENTION

The dyes of the invention, which are characterized by the presence of one sulfonic acid group, corresponding to the formula $SO_3M$, and one sulfamyl group, corresponding to the formula $SO_2NR_5R_6$, are made by conventional procedures by mixing a diazotized aminobenzene and a solution of an appropriate coupling component. One group of dyes according to the invention is made using aminobenzene containing a sulfonic acid group, diazotizing it and coupling into a coupling component containing a sulfamyl group. Another group is made by diazotizing an appropriate sulfanilamide or metanilamide and coupling it into a coupling component containing a sulfonic acid group.

Typical aminobenzenes useful as the diazotizable base in the coupling reaction are sulfanilic acid, metanilic acid, 4-chlorometanilic acid, 6-chlorometanilic acid, 2,5-dichlorosulfanilic acid, 4-bromometanilic acid, 3-sulfo-p-toluidine and 4-methoxymetanilic acid.

Typical sulfanilamides and metanilamides useful as the diazotizable base in the coupling reaction are sulfanilamide, metanilamide, $N^1$-methylsulfanilamide, $N^1$, N$^1$-dimethylsulfanilamide, N$^1$, N$^1$-dicyanoethylsulfanilamide, N$^1$, N$^1$-dihydroxyethylsulfanilamide, N$^1$-methylmetanilamide, N$^1$, N$^1$-diethylmetanilamide, N$^1$, N$^1$-dicyanoethylmetanilamide, 4-chlorometanilamide, N$^1$, N$^1$-dihydroxyethylmetanilamide, N$^1$-(4-butyl)-4-methoxymetanilamide, 6-bromometanilamide and the like.

The diazotizable amine intermediate is diazotized in the usual way by heating it in an aqueous solution of strong mineral acid such as hydrochloric acid, cooling the resulting solution to a temperature of 0°–10° C. and adding thereto a quantity of sodium nitrite slightly in excess of the stoichiometric requirement. An alternate method of diazotization involves dissolving sodium nitrite in concentrated sulfuric acid, heating to a temperature of about 60°–70° C., cooling the resulting solution to 0°–10° C. and adding thereto the diazotizable amine.

Sulfamyl containing couplers useful in preparing the dyes are made by chlorosulfonation of a suitable tertiary amine, followed by reaction with ammonia, a primary aliphatic amine or a secondary aliphatic amine. Tertiary amine bases which are suitable for the chlorosulfonation reaction are made by the reaction between N-alkylaniline or N-cyanoethylaniline or N-hydroxyethylaniline and a benzyl halide. Particularly useful couplers include:

α-(N-methylanilino)-m-toluenesulfonamide,
α-(N-ethylanilino)-m-toluenesulfonamide,
α-(N-cyanoethylanilino)-m-toluenesulfonamide,
α(N-methyl-m-toluino)-m-toluenesulfonamide,
α-(N-ethyl-o-chloroanilino)-m-toluenesulfonamide,
α-(N-ethylamilino)-m-(N,N-dimethyltoluenesulfonamide),
α-(N-cyanoethylanilino)-m-(N-ethyltoluenesulfonamide),
α-(N-methylanilino)-m-(N-cyanoethyltoluenesulfonamide), and
α-(N-ethylanilino)-m-(N,N-dihydroxyethyltoluenesulfonamide).

In making the group of dyes in which the coupler contains a sulfonic acid group the following couplers are useful:

α-(N-methylanilino)-m-toluenesulfonic acid,
α-(N-ethylanilino)-m-toluenesulfonic acid,
α-(N-cyanoethylanilino)-m-toluenesulfonic acid,
α-(N-methyl-m-toluino)-m-toluenesulfonic acid,
α-(N-ethyl-o-chloroanilino)-m-toluenesulfonic acid, The azo dyestuffs used in the invention are made by the reaction of the diazotized amine with the coupler by adding the diazonium salt to a cold aqueous solution of the coupler. A buffering agent, such as sodium acetate is added to reduce the acidity to a pH of 5 to 7. The mixture is allowed to react for 8–24 hours at room temperature and is thereafter filtered. The desired azo product is thus obtained in the form of a wet cake.

The carpet material to be dyed may be broadly defined as a polyamide fiber material. Preferred polyamide fiber materials include the various members of the nylon family. For example, the polyamide material to be colored in accordance with the invention includes polyhexamethylene adipamide, poly(2-methylhexamethylene)oxamide and polycaprolactam. General procedures for using an acid dye for the coloration of a polyamide material are known in the art; examples of suitable methods for dyeing the polyamide material are found in U.S. Pat. No. 3,485,814 and in the examples that follow.

My invention is further illustrated by the following examples:

EXAMPLE I

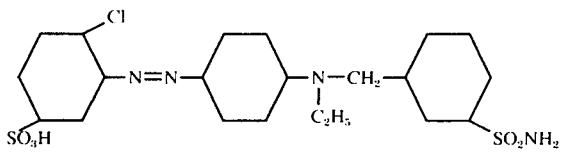

4-Chlorometanilic acid (41.5 g.) is stirred with 160 g. of water and 24 g. of 32% hydrochloric acid. Ice is added to adjust the temperature to 0° C. 13.8 g. of sodium nitrite dissolved in 44 g. of water is added. The diazo is held for 15 minutes with excess nitrite, then the nitrite is destroyed with sulfamic acid.

The coupler is prepared by stirring together 700 g. of water, 55 g. of 32% hydrochloric acid, 63.8 g of α-(N-ethylanilino)-m-toluenesulfonamide, and ice.

The diazotized 4-chlorometanilic acid is then added to the coupler in a thin stream over 2½ hours while the temperature is maintained at 0°–5° C with ice. The coupling mass is stirred overnight allowing the temperature to rise to room temperature. The dye is isolated by vacuum filtration, washed with 1000 ml. of 5% brine and oven dried. Yield: 97.8 g.

EXAMPLE II

A dyebath is prepared from 0.2 g. of dye from Example I, 330 ml. water, 10 ml. 10% monosodium phosphate, and 0.2 g. of a dyeing assistant ("Aminogen 41", a commercially available anionic material). The pH is adjusted to 6.0 with 5% aqueous sodium hydroxide or 5% aqueous acetic acid. A 10.0 g. nylon skein (BCF, T-846, duPont) is entered into the dyebath. The dyebath is heated to the boil and the skein is turned in the boiling bath for 1 hour. The skein is then removed, soaped, rinsed, and dried. The hue is reddish-yellow.

A simlarly dyed skein is placed in a bath prepared as above but without 0.2 g. of dye. An undyed 10.0 g. skein is added to the bath. Both skeins are turned in the boiling bath for one hour. The skeins are then removed from the bath, soaped, rinsed and dried.

The transfer property of the dye is shown by its K/S value. Both the original skein and the previously undyed skein give K/S values of 4.60, showing that the dye has distributed itself equally between the skeins.

The dyed skein shows outstanding lightfastness when exposed in a Xenon Fade-Ometer.

EXAMPLE III

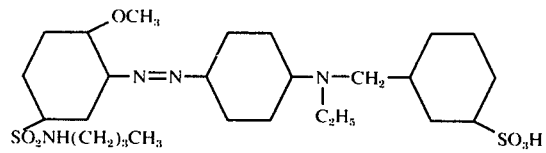

Ponceau L Base, or N$^2$-(butyl)-4-methoxymetanilamide (51.6 g.) is stirred with 150 g. of water and 40 g. of 32% hydrochloric acid. Ice is added to adjust the temperature to 0° C. 13.8 g. of sodium nitrite dissolved in 40 g. of water is added. The diazo is held for 1 hour with excess nitrite, then the excess nitrite is destroyed with sulfamic acid.

The coupler is prepared by stirring together 250 g. of water, 64 g. of α-(N-ethylanilino)-m-toluenesulfonic acid and ice.

The diazotized Ponceau L Base is then added to the coupler in a thin stream over 1½ hours while the temperature is maintained at 0°–5° C. with ice. The coupling mass is stirred overnight allowing the temperature to rise to room temperature. The product is allowed to settle, the liquor is decanted off and the dyestuff is oven dried. Yield: 54 g.

EXAMPLE IV

The dye of Example III is dyed by the same procedure outlined in Example II. The hue is reddish yellow. The transfer property of the dye is excellent. The dye has good lightfastness when exposed to the Xenon Fade-Ometer.

EXAMPLE V

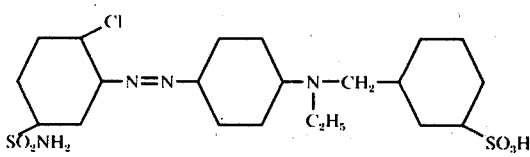

4-Chlorometanilamide (41.4 g) is stirred with 200 g. of water and 50 g. of 32% hydrochloric acid. Ice is added to adjust the temperature to 0° C. 13.8 g. of sodium nitrite dissolved in 40 g. of water is added. The diazo is held for one hour with excess nitrite, then the excess nitrite is destroyed with sulfamic acid.

The coupler is prepared by stirring together 250 g. of water, 64 g. of α-(N-ethylanilino)-m-toluenesulfonic acid, and 14 g. of 50% aqueous sodium hydroxide. The coupler is heated to solution at 55°–60° C.

The coupler is then added to the 4-chlorometanilamide diazo in a thin stream over 1½ hours while the temperature is maintained at 0°–5° C with ice. After the addition, 165 g. of sodium chloride is added. The coupling mass is stirred overnight allowing the temperature to rise to room temperature. The dye is isolated by vacuum filtration, washed with 1100 g. of 10% brine and oven dried. Yield: 39.3 g.

EXAMPLE VI

The dye of Example V is dyed by the same procedure outlined in Example II. The hue is reddish yellow. The transfer property of the dye is excellent. The lightfastness as determined in Example 2 is excellent.

EXAMPLE VII

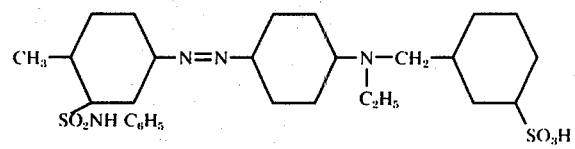

p-Toluidine-2-sulfanilide or $N^1$-(Phenyl)-6-methyl-metanilamide (52.4 g.) is stirred with 200 g. of water and 45 g. of 32% hydrochloric acid. Ice is added to adjust the temperature to 0° C. 14 g. of sodium nitrite dissolved in 45 g. of water is added. The diazo is held for 1 hour with excess nitrite, then the excess nitrite is destroyed with sulfamic acid. The coupler is prepared by stirring together 250 g. of water, 64 g. of α-(N-ethylanilino)-m-toluene-sulfonic acid, and 14 g. of 50% aqueous sodium hydroxide. The coupler is heated to solution at 55°–60° C.

The coupler is then added to the diazo in a thin stream over 1½ hours while the temperature is maintained at 0°–5° C. with ice. The coupling mass is stirred overnight allowing the temperature to rise to room temperature. The dye is isolated by vacuum filtration, washed with 500 ml. of 5% brine solution and oven dried. Yield: 110.0 g.

EXAMPLE VIII

The dye of Example VII is dyed by the same procedure outlined in Example II. The hue is yellow. The transfer property of the dye is excellent. The lightfastness is excellent.

EXAMPLE IX

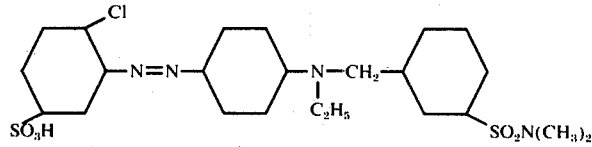

The procedure of Example I is followed except that 70 g. of N,N-dimethyl- -(N-ethylanilino)-m-toluenesulfonamide is substituted for the -(N-ethylanilino)-m-toluenesulfonamide. Yield of dry dye: 108.2 g.

EXAMPLE X

The dye of Example IX is dyed according to the procedure of Example II. The hue obtained is similar to that of Example IV. The light fastness and transfer properties of the dyed nylon are excellent.

EXAMPLES XI–XVII

By procedures similar to those given in Examples I to X, appropriate diazotized amines and couplers give the dyes as tabulated. The columns designated X,Y,Z, $R_1$, etc. refer to the general formula given in the Summary of the Invention.

TABLE I

| EXAMPLE | Y | X | Z | $R_1$ | $R_2$ | $R_3$ | $R_4$ |
|---|---|---|---|---|---|---|---|
| 11 | 2-Cl | 4-SO$_3$H | 5-Cl | C$_2$H$_5$ | 2'-CH$_3$ | H | 3''-SO$_2$N(CH$_2$CH$_2$OH)$_2$ |
| 12 | 2-Cl | 4-SO$_2$N(CH$_2$CH$_2$CN)$_2$ | H | C$_2$H$_5$ | 3'-Cl | H | 3''-SO$_3$H |
| 13 | 2-Br | 5-SO$_3$H | H | —CH$_2$CH$_2$CN | H | H | 3''-SO$_3$H |
| 14 | 2-Cl | 4-SO$_3$H | 5-Cl | —CH$_2$CH$_2$CONHCH$_3$ | H | H | 3''-SO$_2$NHCH$_3$ |
| 15 | 2-Cl | 5-SO$_2$NH$_2$ | H | C$_2$H$_5$ | 3'-OCH$_3$ | 6'-CH$_3$ | 3''-SO$_3$H |

TABLE I-continued

| | | | EXAMPLES XI–XVII | | | | |
|---|---|---|---|---|---|---|---|
| 16 | 2-Cl | 5-SO$_2$NH$_2$ | H | C$_2$H$_5$ | 2'-Br | H | 3''-SO$_3$H |
| 17 | H | 4-SO$_3$H | H | C$_2$H$_5$ | H | H | 3''-SO$_2$N(CH$_3$)$_2$ |

| EXAMPLE | SHADE | TRANSFER | LIGHTFASTNESS |
|---|---|---|---|
| 11 | Orange | Excellent | Excellent |
| 12 | Reddish-Orange | Excellent | Excellent |
| 13 | Orange | Excellent | Excellent |
| 14 | Orange | Excellent | Excellent |
| 15 | Orange | Excellent | Fair |
| 16 | Reddish-Yellow | Excellent | Excellent |
| 17 | Yellow | Excellent | Excellent |

What is claimed is:

1. A dye of the formula:

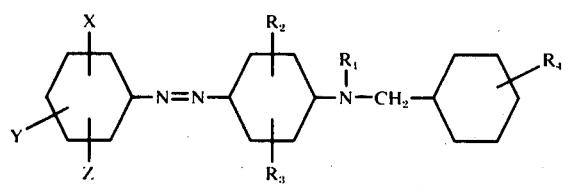

wherein:
a. X is a member selected from the group consisting of SO$_3$M and SO$_2$NR$_5$R$_6$ in which:
   1. M is hydrogen, alkali metal, ammonium or hydroxy-alkylammonium wherein the alkyl has 3–12 carbon atoms; and
   2. R$_2$ and R$_6$ are independently selected from the group consisting of hydrogen, lower alkyl, cyano lower alkyl, phenyl, and hydroxy lower alkyl;
b. Y and Z are members independently selected from the the group consisting of hydrogen, chlorine, bromine, lower alkyl, and lower alkoxy;
c. R$_2$ and R$_3$ are members independently selected from the group consisting of hydrogen, lower alkyl, lower alkoxy, chlorine and bromine;
d. R$_1$ is a member selected from the group consisting of lower alkyl, cyano lower alkyl and N-lower alkyl carbamyl; and
e. R$_4$ is independently selected from the same group as X, except that when R$_4$ is SO$_3$M, X is SO$_2$NR$_5$R$_6$ and that when X is SO$_3$M, R$_4$ is SO$_2$NR$_5$R$_6$.

2. A dye of claim 1 of the formula:

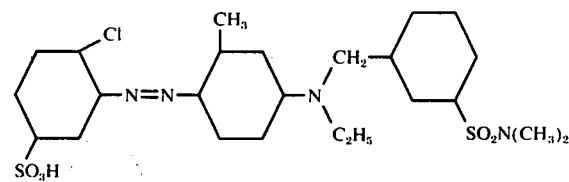

3. A dye of claim 1 of the formula:

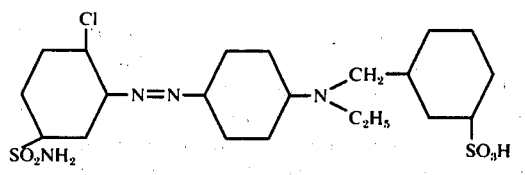

4. A dye of claim 1 of the formula:

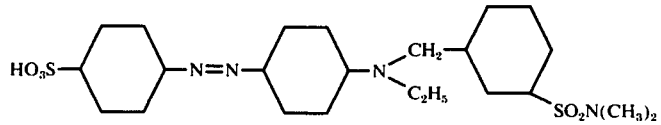

5. A dye of claim 1 of the formula:

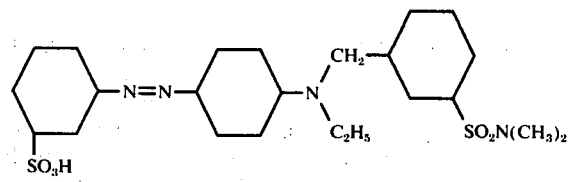

6. A dye of claim 1 of the formula:

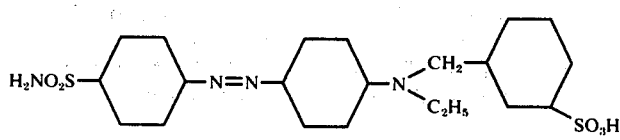

* * * * *

UNITED STATES PATENT OFFICE
CERTIFICATE OF CORRECTION

Patent No. 4,020,053            Dated April 26, 1977

Inventor(s) Allan M. Huffman

It is certified that error appears in the above-identified patent and that said Letters Patent are hereby corrected as shown below:

Column 7, line 31 "$R_2^*$" should read -- $R_5$ --.

Signed and Sealed this twenty-sixth Day of July 1977

[SEAL]

Attest:

RUTH C. MASON
*Attesting Officer*

C. MARSHALL DANN
*Commissioner of Patents and Trademarks*